TIME ASSIGNMENT SPEECH INTERPOLATION SYSTEM

Original Filed Sept. 26, 1957 5 Sheets-Sheet 1

INVENTORS F. A. SAAL
I. WELBER
BY W. L. Keefauver
ATTORNEY

TIME ASSIGNMENT SPEECH INTERPOLATION SYSTEM

Original Filed Sept. 26, 1957 5 Sheets-Sheet 2

INVENTORS F. A. SAAL
I. WELBER
BY W. L. Keefauver
ATTORNEY

TIME ASSIGNMENT SPEECH INTERPOLATION SYSTEM

Original Filed Sept. 26, 1957 5 Sheets-Sheet 3

INVENTORS F. A. SAAL
I. WELBER

BY W. L. Keefauver

ATTORNEY

TIME ASSIGNMENT SPEECH INTERPOLATION SYSTEM

Original Filed Sept. 26, 1957 5 Sheets-Sheet 4

INVENTORS F. A. SAAL
I. WELBER

BY W. L. Keefauver

ATTORNEY

TIME ASSIGNMENT SPEECH INTERPOLATION SYSTEM

Original Filed Sept. 26, 1957 5 Sheets-Sheet 5

INVENTORS F. A. SAAL
I. WELBER

BY W. K. Keefauver

ATTORNEY

United States Patent Office

Re. 25,546
Reissued Mar. 31, 1964

25,546
TIME ASSIGNMENT SPEECH INTERPOLATION SYSTEM

Frederick A. Saal, Plainfield, and Irwin Welber, New Providence, N.J., assignors to Bell Telephone Laboratories, Incorporated, New York, N.Y., a corporation of New York Original No. 2,935,569, dated May 3, 1960, Ser. No. 686,468, Sept. 26, 1957. Application for reissue Apr. 27, 1962, Ser. No. 193,047
24 Claims. (Cl. 179—15)

Figure 1:
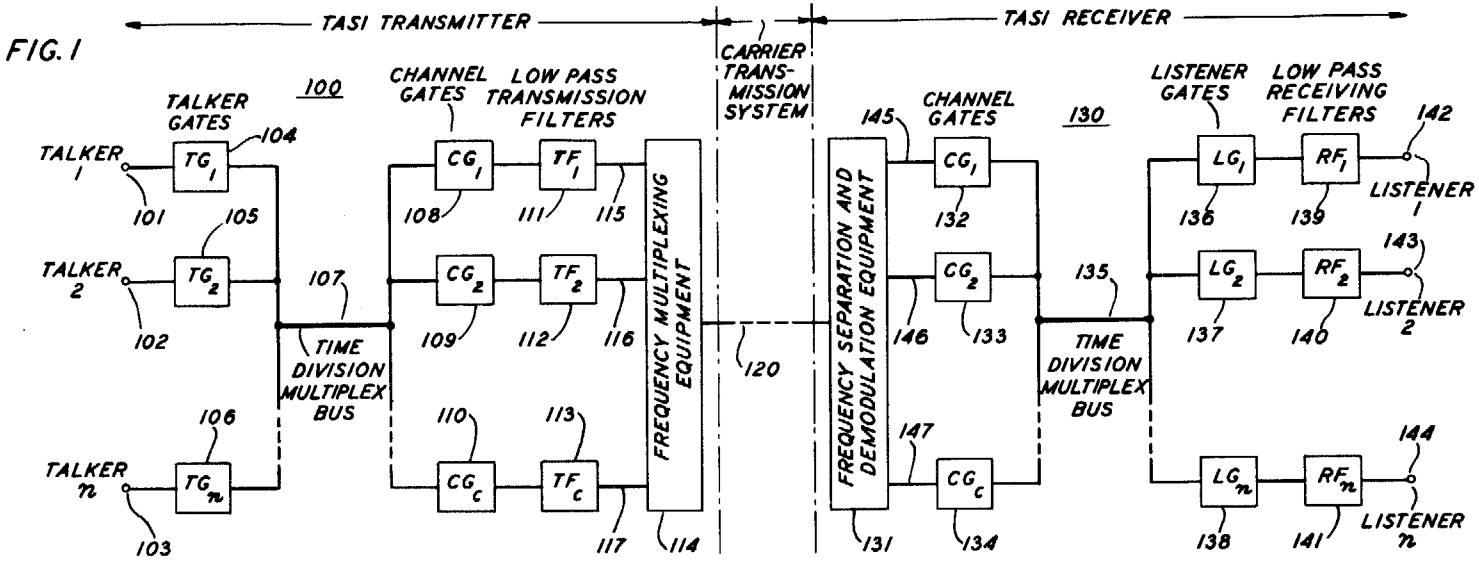

Matter enclosed in heavy brackets [ ] appears in the original patent but forms no part of this reissue specification; matter printed in italics indicates the additions made by reissue.

This invention relates to electrical switching systems and, more particularly, to switching arrangements for time assignment speech interpolation systems.

When making use of expensive transmission facilities such as the channels in a transatlantic cable, it is most economical to make full use of all of the available channel time. Various systems for saving channel time have been proposed which utilize the statistical fact that telephone conversations use the facilities in one direction, on the average, for less than one-third of the time. Therefore, by interconnecting the two parties only when the line is active, large savings in channel time may be effected. The terminal switching facilities which perform this function have been termed "time assignment speech interpolation" systems or, more conveniently, "TASI" systems.

Some of the TASI systems heretofore proposed have interconnected talker lines and transmission channels by means of time separation multiplex switching (TSM switching) rather than by the cross point switching common to telephone facilities. These systems utilize the principle that speech, or any other signal, can be adequately represented by samples spaced in time, provided the sampling rate is at least twice the highest frequency component of the signal to be represented. The interconnection of talker lines and transmission channels has therefore been made by simultaneously gating a particular talker line and a particular transmission channel onto a common multiplex bus for the same sample interval. By interleaving speech samples from all the active talkers and gating them to proper transmission channels at a sufficiently high rate, speech signals on all of the talker lines can utilize the same multiplex bus and yet each be accurately reproduced on the individual transmission channels. The supervisory equipment which makes this assignment of active talkers to idle channels and controls the switching sequence has, however, heretofore been unsuitable in many respects for use with large transmission systems, such as submarine cable systems, having a large number of transmission channels and a correspondingly large number of talker lines.

Accordingly, one object of the present invention is to extend the use of time assignment speech interpolation systems to large transmission facilities such as submarine cable systems.

To make full use of the statistical fact mentioned above, it is desirable to have as many talkers as possible included in any one TASI system so that the distribution of the overall activity pattern of the talkers will be very nearly random. In the TSM switching TASI systems heretofore proposed, however, the rate at which the switching and control functions had to be performed increased rapidly with the size of the system, i.e., the number of talkers which could be accommodated. Hence, the larger the system, the more difficult it became to design components and the less reliable these components were in operation.

It is therefore a more specific object of the invention to reduce the speed at which the time separation multiplex switching operations are performed in a time assignment speech interpolation system.

In TSM switching TASI systems, the activity of the individual talkers is ascertained by systematically scanning speech detectors connected to the individual talker lines and by synchronously generating a talker identity code for each active talker. A circulating or re-entrant memory is used to register the assignment of a particular active talker to a particular idle channel. The contents of the memory are then used to control the multiplex switching operation. In systems of this type heretofore proposed, scanning and switching functions have been correlated by allowing two complete "revolutions" of the memory during the interval for which a single speech detector is being scanned, once to ascertain whether or not the talker has been previously assigned and the second time to assign the talker if he has not been previously assigned. Since the multiplex switches must be synchronized with the memory, they also are operated twice for each speech detector scanning interval. Such a system is disclosed in the copending application of R. L. Carbrey, Serial Number 430,181, filed May 17, 1954, since matured into U.S. Patent 2,907,829, issued October 6, 1959.

In accordance with the present invention, the necessity for operating the circulating memory of a time separation multiplex switching circuit a plurality of times during each scanning interval for each speech detector is avoided by inserting a "short memory" buffer storage register between the talker activity scanner and the memory and by removing the speech detector output once that talker is registered. This short memory register holds the talker identity until a vacant time slot appears in the circulating memory and thus does away with the necessity for integrally related and highly synchronized operation. This arrangement allows these operations to be performed at their most economical and practical speeds which, in fact, are much lower than those required in prior systems of this type.

A major advantage of such a short memory register resides in its further use as a convenient means for queuing up the talkers as they become active. By adding as many stages of the storage as are desired, any number of talkers may be queued. This becomes an important consideration in large systems where many talkers may become active at substantially the same time.

Proceeding to another phase of TASI systems, the essential function of coordinating talker-to-channel assignments at the transmitter with channel-to-listener assignments at the received will now be considered. In-band multifrequency signaling tones sent over the idle channel to indicate the proper listener connection to be made to that channel are suitable for this purpose. These tones must be sustained for a sufficient length of time to insure their accurate reception, i.e., on the order of ten milliseconds with present filters of economical design. In TASI systems of the prior art, this timing was controlled by a single timing circuit capable of handling only one channel at a time. Large transmission systems having many talkers demanding connection at one time, however, require a signaling arrangement which will accommodate more than one talker simultaneously.

It is therefore another object of the invention to increase the number of control signals which can be simultaneously transmitted in a time assignment speech interpolation system.

In accordance with this aspect of the invention, a timing code is generated and associated with each talker identity code as the talker becomes active and is registered in the circulating memory. The same code is also delayed for the necessary ten milliseconds by means of a multistage storage register. A comparison made between the output of the storage register and the contents of the memory will therefore indicate, at the instant the timing codes are identical, that the signaling interval is over. This storage register may have as many stages as desired and thus accommodate as many talkers as required.

The system of the present invention also includes other improved features such as a separate channel for disconnect signaling to allow rapid transmission of this essential information, channel status code digits included in the circulating memory to control the signaling, switching and entry operations, and static rather than circulating memories in the TASI receiver to permit more accurate error checking and correction.

These and other objects and features, the nature of the present invention and its various advantages, will appear more fully upon consideration of the attached drawings and the following detailed description of the drawings.

Figure 6:
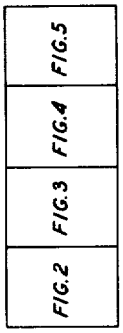
Figure 2:
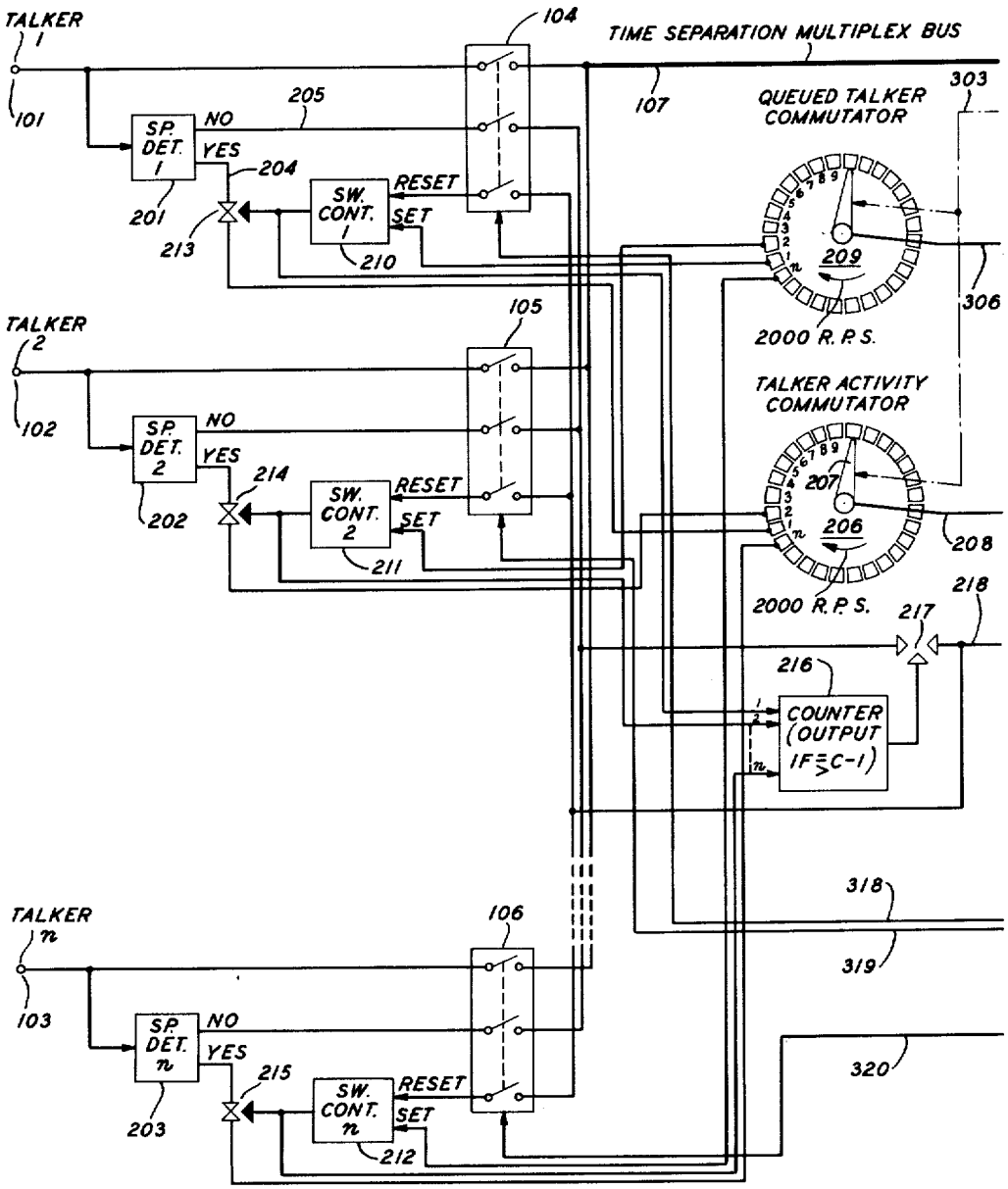

In the drawings:

FIG. 1 is a simplified functional block diagram of a time assignment speech interpolation system illustrating the time separation multiplex switching arrangements used in the present invention;

FIGS. 2 through 5, when arranged in the manner shown in FIG. 6, show a detailed block diagram of an improved time assignment speech interpolation system in accordance with the present invention.

Concerning numerical cross references between the description below and the drawings, it may be noted that the figure numbers are arranged to coincide with the sheet numbers for purposes of simplicity. In addition, the hundreds digit of each reference numeral indicates the sheet of the drawings on which the reference numeral first appears.

As discussed in the introduction, the object of a time assignment speech interpolation system is to save channel time by assigning channels to the talkers and listeners only when the talkers are actively engaged in talking or making a "speech spurt." In a time separation multiplex switching system, the connections between the talkers at the transmitter and the listeners at the receiver are effected through a universal access time divided switching arrangement in which there is assigned one channel time slot for each speech channel which interconnects the transmitter and the receiver. Continuity of assignment of a channel to a particular talker-listener pair for the duration of a speech spurt and thereafter is insured by memory units at both the transmitter and receiver which control the party-to-channel switching assignments.

Referring more specifically to FIG. 1 of the drawings, there is shown a time assignment speech interpolation system comprising a TASI transmitter 100, a carrier transmission line 120, and a TASI receiver 130. While the connecting link between transmitter 100 and receiver 130 is shown, for the purposes of illustration, as a carrier transmission line 120 requiring frequency multiplexing equipment 114 and frequency separation and demodulation equipment 131, this link may just as well be any other form of multichannel transmission facility such as, for example, a plurality of separate transmission lines, a time multiplexed transmission medium or a multiconductor voice frequency cable. For convenience, only the speech paths of the TASI system have been shown in FIG. 1 and all control equipment has been omitted.

A plurality of input terminals 101, 102 and 103 are provided for connecting n signal sources, represented by talker 1, talker 2 . . . talker n, to TASI transmitter 100. Input terminals 101, 102 and 103 are connected to a common time division multiplex bus 107 by way of talker gates 104, 105 and 106, respectively. Bus 107 is in turn connected to c (where c is less than n transmission channels 115, 116 . . . 117, by way of channel gates 108, 109 and 110 and low pass transmission filters 111, 112 and 113, respectively. These c transmission channels represented by reference numerals 115, 116 and 117, are connected to frequency multiplexing equipment 114 where, by means well-known in the art, the signals appearing on these channels modulate carrier waves to form frequency multiplexed signals which are sent out over a carrier transmission line 120. Transmission line 120 is merely illustrative and may comprise a coaxial cable such as a submarine cable, a radio relay link, or any other form of carrier transmission facility and may have included therein repeaters, equalizers, etc.

At some geographically distant point from TASI transmitter 100, carrier transmission line 120 is connected to TASI receiver 130 by way of frequency separation and demodulating equipment 131, which equipment may comprise any of the well-known circuits for accomplishing this purpose. Demodulating equipment 131 converts the frequency multiplexed signal on line 120 into c separate demodulated signal outputs on transmission channels 145, 146 . . . 147, corresponding, respectively, to the c transmission channels 115, 116 and 117. Transmission channels 145, 146 and 147 are connected to a common time division multiplex bus 135 by way of channel gates 132, 133 and 134, respectively. Bus 135, in turn, is connected to n output terminals 142, 143 . . . 144, corresponding, respectively, to the n input terminals 101, 102 . . . 103, by way of listener gates 136, 137 and 138 and low pass receiving filters 139, 140 and 141, respectively. These output terminals 142, 143 and 144 are provided for connecting n signal utilizing means, represented by listener 1, listener 2 . . . listener n to TASI receiver 130.

As discussed above, switching arrangements, not shown, are provided to connect any talker to the corresponding listener only while that talker is active, i.e., initiating a speech spurt. The economy of the system arises from the fact that n, the number of talkers and corresponding listeners, is much greater than c, the number of transmission channels available. Furthermore, it has been established that, up to a limit, the larger the number of talkers connected to the TASI system, the larger the ratio of talkers-to-channels can be, thus increasing the effectiveness of the system as measured by this ratio. Specifically, it has been estimated that four channels ($c=4$) can handle the calls of seven talkers ($n=7$), that eight channels can handle the calls of 16 talkers, that 12 channels can handle the calls of 32 talkers, and that 36 channels can handle the calls of 120 talkers. The last case, where $c=36$, $n=120$ and the ratio $c/n$ is 30 percent represents the approximate upper limit as given by the statistical distribution of speech for the average talker. It is therefore evident that the larger the number of channels, up to the limit, the greater is the economy which can be obtained and hence the more economically feasible is the system.

The operation of the time separation multiplex switching arrangements will now be discussed. As noted in the introduction, speech or any other signal may be adequately represented by samples spaced in time provided the sampling rate is at least twice the highest frequency component to be transmitted. Since the standard voice channel for telephone transmission has a bandwidth of 4000 cycles, this sampling rate must be at least 8000 samples per second. Utilizing this fact, the TASI system shown in FIG. 1 connects individual talkers to individual channels at the transmitter 100, and connects this same channel to the corresponding listener at the receiver 130 by means of samples transmitted over the multiplex buses 107 and 135 which are repeated at an 8000 samples per second rate. The low pass transmission filters 111, 112 . . . 113 reconstruct the original speech signals from their respective samples by filtering out the high frequency sampling components and, in effect, integrating the samples to form a continuous wave. These low pass filters 111, 112 and 113 therefore have a cutoff frequency of 4000 cycles per second, the bandwidth of the speech signal.

Similarly, at the TASI receiver 130 the low pass receiving filters 139, 140 . . . 141 reconstruct the original speech signal from the samples transmitted by channel gates 132, 133 and 134 and listener gates 136, 137 and 138. The signal ultimately delivered to the listeners is therefore a reproduction of the signal originally initiated by the talkers.

In order to systematically connect the transmission channels to the proper talker-listener pair, each transmission channel is assigned a time slot in the 125 microsecond interval between successive samples taken at the 8000 per second sampling rate. Thus each channel gate at the transmitter 100 and each channel gate at the receiver 130 is closed for a predetermined portion of the $$\frac{125}{c}$$

microsecond interval allotted to each channel, where c is the number of channels in the system. This switching operation is carried on in a cyclic fashion beginning with channel gates 108 and 132, proceeding through all of the channel gates in a sequence to channel gates 113 and 134 and then returning to the first channel gates 108 and 132. Since the signal is reconstructed by low pass filters 111, 112 . . . 113, the channel and listener gates at the receiver 130 need not be synchronized with the talker and channel gates at the transmitter 100.

Switching control apparatus, not shown in the simplified block diagram of FIG. 1, then assigns an active talker to a particular idle channel and closes this talker's talker gate during precisely the same interval during which the channel gate of the assigned channel is closed. As an example of this operation, suppose that talker 2 becomes active and that channel 1 (115) is idle. The switching control apparatus then closes talker gate 105 during the time interval that channel gate 108 is closed, thus transmitting a sample of talker 2's speech to channel 115. Thereafter, these same two gates, 105 and 108, close simultaneously during each time slot assigned to channel 115 and thus transmit speech samples to low pass filter 111 at an 8000 per second sampling rate. Of course, this switching control apparatus is also simultaneously assigning other active talkers to other available channels and closing the appropriate gates during the proper time slot intervals. The TASI receiver 130, by means of suitable supervisory signals sent over the transmission system 120, is also assigning listeners to the same channels that the corresponding talker is assigned to and is closing the appropriate gates during the proper time slot intervals.

It will be noted that at both the transmitter 100 and at the receiver 130, all of the speech samples for all of the talkers and listeners are transmitted over common, universal access buses 107 and 135. These samples are distinguished only by their separation in time and these buses have therefore been termed time separation multiplex buses or TSM buses.

It will be further noted that the TASI system shown in FIG. 1 is suitable for transmitting signals in only one direction, from TASI transmitter 100 to TASI receiver 130. In order to provide a complete two-way communication system, it is necessary to duplicate the system shown in FIG. 1 and use one such system for transmission in one direction and the other for transmission in the opposite direction.

Having described the essential characteristics of the time separation multiplex switching in a time assignment speech interpolation system, we will now proceed to the detailed explanation of a TASI system illustrative of and embodying the principles of the invention. A detailed block diagram of such a system is presented in FIGS. 2 through 5 of the drawings which must be arranged as shown in FIG. 6 to form a coherent circuit.

The general conformity of the detailed block diagram of FIGS. 2 through 5 to the simplified diagram of FIG. 1 will now be established. The input terminals which appear to the left of FIG. 1 in the simplified circuit are found along the left side of FIG. 2 in the detailed circuit. The time separation multiplex bus 107 in the simplified circuit of FIG. 1 is located along the top of FIGS. 2 and 3 in the detailed circuit. The carrier transmission line 120 of the simplified circuit of FIG. 1 appears at the center and top of FIG. 4 in the detailed circuit and the time separation multiplex bus 135 is found at the top of FIG. 5 of the detailed circuit.

Now that the correspondence between a few of the key components of the simplified and detailed circuits have been established, the block diagram of FIGS. 2 through 5 will be considered in detail.

As described with reference to FIG. 1, a plurality of input terminals 101, 102 . . . 103, to which are connected individual speech sources, such as telephone transmitters, are connected through talker gates comprising switches 104, 105 . . . 106 to a common time separation multiplex bus 107 which is, in turn, gated to a lesser number of transmission channels 115, 116 and 117 through low pass transmission filters 111, 112 and 113, respectively. These transmission channels are, in the illustrative embodiment, frequency multiplexed and transmitted over a carrier transmission system 120. At the TASI receiver these same transmission channels, now represented by numerals 145, 146 and 147, are recovered from the frequency multiplexed signal and are gated to a second time separation multiplex bus 135 which is, in turn, gated by means of listener gates 136, 137 and 138 to low pass receiving filters 139, 140 and 141 and thence to output terminals 142, 143 and 144, respectively. It can therefore be seen that the connection between corresponding talkers and listeners is made through a time separation multiplex switching arrangement at both the TASI transmitter and at the TASI receiver. Channel banks 401 modulate and frequency multiplex the transmission channels in a manner well known to those skilled in the art. Similarly, channel banks 402 demodulate this frequency multiplexed signal, recover the original audio waves therefrom, and deliver them to the respective individual channels.

It will be apparent that in order to connect the proper talker to the proper corresponding listener, means must be provided to assign active talkers to specific transmission channels at the transmitter and to duplicate these same assignments at the receiver. The remaining portions of the detailed block diagram of FIGS. 2 through 5 are used to perform this essential function. A detailed description of these portions of a block diagram will be given with special reference to the basic functions of (1) initial assignments, (2) indication to the receiver of this particular assignment, (3) indication to the receiver that the assignment may be terminated, and (4) utilization of these signals by the receiver to control receiver assignments. These functions will hereinafter be termed assignment, connection, disconnection and reception, respectively.

ASSIGNMENT

It is apparent that since a lesser number of transmission channels are provided than the total number of talker-listener pairs to be accommodated, it is not only necessary to make assignments of talkers to channels but it is also necessary to change these assignment when active talkers become inactive and other talkers become active. In the illustrative embodiment of the invention shown in FIGS. 2 through 5, the total number of talker-listener pairs is n while the total number of transmission channels is c, where c is substantially less than n. For example, in a system having 36 frequency multiplexed transmission channels of four kilocycles bandwidth each, c would equal 36. Such a transmission system is capable of handling 120 talker-listener pairs, in which case n would equal 120.

Proceeding to a detailed description of the TASI system of the present invention, each talker, that is, talker 1, talker 2 . . . talker n, is provided with a speech detector which may be any form of amplitude threshold signal detecting device well known to the art. Thus, talker 1 is provided with a speech detector 201, talker 2 is provided with a speech detector 202 and talker n is provided with a speech detector 203. The function of these speech detectors is to monitor their respective talker lines and to produce an output which indicates when the signal on that particular talker line exceeds a predetermined minimum level. Thus, speech detector 201 produces an output, for example, a pulse, on "Yes" output line 204 whenever the signal level of talker 1's line exceeds this predetermined threshold and at all other times produces an output on "No" output line 205.

The "Yes" output lines of all the speech detectors 201, 202 . . . 203 are scanned by a talker activity commutator 206. Talker activity commutator 206 is shown as a mechanical collecting commutator having a brush 207 successively contacting n segments to which the outputs of the individual speech detectors are connected. This commutator 206 is indicated as having a rotational speed of 2000 revolutions per second. In an actual embodiment of the electronic commutators known to the art but in any case has a switching speed of 2000 revolutions per second.

It can be seen that on line 208, connected to rotating brush 207, there will appear in succession samples of the "Yes" output of all the individual speech detectors. If any particular talker is active, the "Yes" output line of his speech detector will have thereon some definite signal level, e.g., a pulse. However, if that particular talker is not active, the Yes output line of his speech detector will have a markedly different signal level, e.g., no pulse. Thus, the signal on line 208 will comprise a series of pulses, these pulses occurring in time slots corresponding to active ones of the talkers. In the time slots corresponding to inactive talkers, there will be no pulse and hence merely a period of no signal. The use made of this pulse sequence will be described hereinafter.

Figure 3:
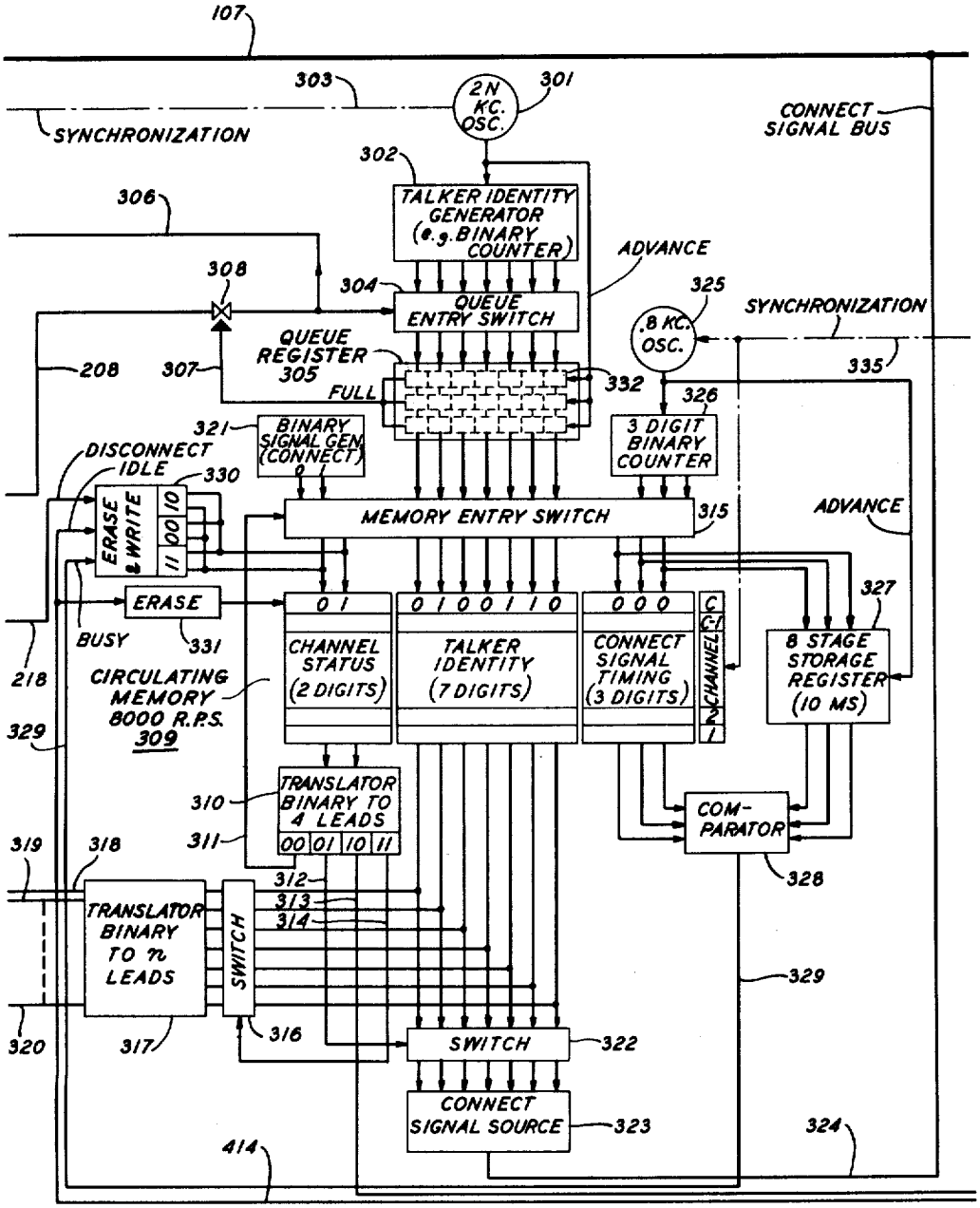

Going now to FIG. 3, there is shown an oscillator 301 having an output frequency of 2n kilocycles. Oscillator 301 may be any one of the many fixed frequency oscillators known to the art such as, for example, a crystal controlled oscillator. Oscillator 301 drives a talker identity generator 302 which may comprise a conventional binary counter having a sufficient number of stages to enable it to count up to the total number of talkers (n). Seven stages are thus required in the illustrative embodiment. Talker identity generator 302 is therefore shown with seven output leads enabling it to count in the binary scale up to 128. If, as discussed above, only 120 talkers are being accommodated, generator 302 would include means for resetting the counter to zero upon arriving at a count of 120. As shown by dashed lines 303, oscillator 301 and commutator 206 are synchronized in such a manner that when brush 207 rests upon a commutator segment corresponding to a particular talker line, talker identity generator 302 is simultaneously generating a seven digit binary code identifying that particular talker.

When a particular talker is active, the pulse on line 208 indicating this activity operates a queue entry switch 304 which gates the talker identity code for that particular talker into a queue register 305. Queue register 305 comprises a plurality of seven bit storage registers, such as storage register 332, arranged in series, for example, three stages as illustrated. Considering each of these storage registers as a stage of the queue register, the talker identity codes are gated, in parallel, by queue entry switch 304 into the first stage of the queue register 305. Under the control of an advance pulse from oscillator 301, a code gated into this first stage in one cycle is advanced, still in parallel, into the second stage during the succeeding cycle provided, as may be ascertained by simple logic, the second stage is empty. This clears the first stage to receive another talker identity code group. Sufficient delay is built into switch 304 to permit the first stage to be cleared before a new code is introduced. In much the same manner, the code in the second stage is advanced on the next succeeding cycle to the third stage. Once, however, the identity code of a particular active talker has been stored in queue register 305, means must be provided to disable the output of his particular speech detector in order that his code is not again entered in register 305. The means by which this is accomplished will now be described.

The active talker pulse samples appearing on line 208 are also introduced by way of line 306 into a queued talker commutator 209 similar to commutator 206. Commutator 209, however, instead of collecting samples of the output of the speech detectors, distributes the already collected samples to its n commutator segments, each one corresponding to a particular talker line. These pulses, indicating the activity of particular talkers, are fed back to switch control circuits 210, 211 . . . 212, respectively, which are associated with the corresponding talker lines. These switch control circuits are, for example, "flip-flop" bistable multivibrator circuits which, upon being set by the pulses from commutator 209, produce an output which operates switches 213, 214 . . . 215 and disable the Yes output lines of the particular speech detectors. Switches 213, 214 and 215 are shown as the conventional schematic representation of normally closed switches. They may comprise any form of fast operating electronic switches known in the art, such as diode gates. It can thus be seen that the presence of a signal on the Yes output line of each speech detector operates to introduce the code identity of that particular talker into queue register 305 and at the same time operates to disable that particular Yes output line.

Returning to FIG. 3, queue register 305, as discussed above, has a plurality of stages, each comprising a storage register. When all stages are occupied, an indication thereof on line 307 disables switch 308 to prevent the introduction of any more talker activity codes into the queue register. This may be accomplished, for example, by providing an extra storage slot in each storage register and generating an extra digit, to be stored in these slots, with each talker identity code. The presence of this digit in each extra slot, readily detectable by a simple AND gate, will indicate that the queue register is full.

Queue register 305 therefore can store a number (three in the illustrated embodiment) of identity codes of active talkers. The use to which these "queued" talker identity cores will be put will be described hereinafter but for the present, it will be noted that this register permits the scanning of the talker lines at one rate and the operation of the channel gates at a different and asynchronous rate.

For convenience, circulating memory unit 309 will now be described. Memory unit 309 is a re-entrant type of memory unit such as, for example, a plurality of parallel delay loops, having a capacity of c words of 12 "bits" each. These 12 bits are circulated in synchronism with each other at a rate of 8000 revolutions per second. Seven of these 12 bits represent the talker identity code generated in talker identity generator 302. Three more of these bits represent connect signal timing information which will be more fully described below. The remaining two bits, called channel status digits, carry information as to the present status of the channel which is associated with that particular time slot in the memory unit. The function of these channel status digits will now be described.

The two channel status digits permit the representation in binary form of any one out of four different states or conditions of each individual transmission channel.

For convenience, these states and the corresponding binary code representations have been chosen as follows:

| State: | Code |
|---|---|
| Channel available for use ("idle") | 00 |
| Channel being signaled over for connection ("connect") | 01 |
| Channel being held for disconnection ("disconnect") | 10 |
| Channel being used for speech ("busy") | 11 |

A translator 310 is provided for taking these two-digit binary representations and providing an output signal on one out of four output leads corresponding to the particular binary number introduced at its input. Thus, a binary "00" produces a signal on output lead 311, a binary "01" produces an output on line 312, a binary "10" produces an output on lead 313, and a binary "11" produces an output on lead 314.

As indicated by dashed line 335, the circulating memory unit 309 is synchronized with a distributing commutator 403. Distributing commutator 403 is similar to commutators 206 and 208 except that it has only c commutator segments rather than n segments. Commutator 403 performs the functions of the channel gates 108, 109 . . . 110 shown in FIG. 1. That is, commutator 403 successively connects TSM bus 107 to transmission channels 115, 116 and 117 in regular succession by way of low pass filters 111, 112 . . . 113, respectively. Commutator 403 is rotating at a speed of 8000 revolutions per second, and hence the sampling rate for individual speech spurts is also 8000 per second, or twice the highest frequency of the normal telephone channel. Furthermore, commutator 403 is rotated in exact synchronism with memory unit 309, thus associating each time slot in memory 309 with a particular transmission channel. This time association is indicated by the decimal numbers along the right side of memory unit 309.

Memory unit 309 is illustrated as a plurality of successive "slots" numbered along the right hand side to correspond with the c channels of the transmission system. These "slots" (between successive horizontal lines) are illustrative of the time slots which appear in a circulating delay type of memory unit. Since memory unit 309 is circulating or re-entrant, channel one, shown in the slot labeled 1, that is, the "bottom" slot, in the next time interval appears in the position of the slot labeled c, that is, the top slot. At the same time all of the other channels advance one time slot so that channel 2 is now in the "bottom" slot and channel c is now in the c—1 slot. This circulation continues at the rate of 8000 revolutions per second.

The circuitry which is shown as being connected to the bottom slot, for example, translator 310, actually is connected to a fixed position in the circulating memory loops such that all of the channel time slots proceed past this position in regular succession. Translator 310, for example, therefore "sees" the channel status digits of channel 1, then channel 2, and so forth down to channel c—1, channel c and then channel 1 again. Furthermore, translator 310 sees the output of the bottom slot and hence the same information that is now in the top slot and subject to erase and write operations. In this way the control functions are operative upon the succeeding time slot rather than upon the same time slot from which the control information is read.

As described above, each time slot has a capacity of twelve bits. As a specific example, the horizontal line corresponding to the "top" time slot and representing channel c, is shown to contain twelve specific bits of information. The seven center bits or digits constitute a binary code representing the identity of a particular talker assigned to that channel. Thus the "0100110" code in this portion of memory unit 309 indicates that channel c has been assigned to talker 38 (the decimal equivalent of "0100110"). Similarly, the channel status portion of the channel c time slot contains the digits "01" indicating that this channel is being signaled over for connection. The "000" code in the connect signal timing portion of memory unit 309 merely indicates that the connect signal timing has begun at this particular count of a repetitive timing code counter.

Returning to memory unit 309 in FIG. 3, the actual assignment of active talkers to idle channels will now be considered. As described above, a binary "00" in the channel status portion of the memory unit 309 will produce an output from translator 310 on line 311. Thus output on line 311 operates a memory entry switch 315 which comprises 12 separate switches connecting 12 input leads to 12 corresponding output leads. Memory entry switch 315 thus gates the talker identity code in the last or bottom stage of queue register 305 into the top time slot position in memory 309. Since memory 309 is of the circulating or re-entry type, the channel status digits introduced into translator 310 correspond to that channel which next appears in the top time slot of the memory unit. This is indicated as channel c along the right-hand side of memory unit 309. Since each time slot of circulating memory unit 309 is uniquely related to a particular transmission channel by its time synchronism with distributing commutator 403, this particular talker identity code has been "assigned" to a particular channel.

Circulating memory unit 309 circulates this talker identity code continuously, always in synchronism with commutator 403. Thus, the assignment of the particular talker to the particular channel is retained in the memory unit for an indefinite length of time, thus providing a "seize and hold" type of assignment. A definite removal or erasure of this assignment is required to disassociate this talker and this channel.

If the binary number "11" is in the channel status digit portion of the memory unit 309 for a particular channel, an output is produced by translator 310 on output line 314. This output operates a switch 316 which samples the talker identity code and delivers this code sample to a translator 317. This sampling operation is nondestructive and the talker identity code is therefore allowed to continue to circulate in memory unit 309. Translator 317 translates the seven-digit talker identity code to an output on one out of n output leads. Thus the binary number one, represented by "0000001," produces an output on line 318, a binary two ("0000010") produces an output on output line 319, and a binary n produces an output on output line 320. A signal on line 318 operates switch 104 which gates the input line of talker one onto time separation multiplex bus 107. Similarly, an output on line 319 operates switch 105 and gates talker two to TSM bus 107, and an output on line 320 operates switch 106 and gates talker n to bus 107. From the above it can be seen that the talker identity code in memory unit 309 operates to gate the talker corresponding to that code onto the time separation multiplex bus at the same instant and for the same interval that distributing commutator 403 is gating the TSM bus to the transmission channel assigned to that particular time slot in memory unit 309. The memory unit therefore retains the proper assignment and, furthermore, controls the switching of the various talker gates in accordance with those assignments.

It will be noted that while talker identity generator 302 is operated in synchronism with commutators 206 and 209 and while circulating memory unit 309 is operated in synchronism with distributing commutator 403, in accordance with the present invention, the talker identity generator 302 is not indicated as being in synchronism with memory unit 309. This nonsynchronous operation of the identity generator and the memory unit has been done to permit the talker activity commutator 206 and the distributing commutator 403 each to operate at its most economical and convenient speed. As discussed above, distributing commutator 403 may best be operated at an eight kilocycle rate. At this rate speech samples delivered to the transmission channels can be reconstructed by low pass fiters without any loss of intelligence. Higher switching speeds would merely complicate the design of the switching components with no gain in transmission quality.

Similarly, the speed of commutator 206 is determined by the frequency and duration of possible speech spurts which must be transmitted by the TASI system. It has been found that if each talker line is scanned once each 500 microseconds, substantially all audible speech signals will be recognized by the TASI system and transmitted to the listening or receiving end. Thus, the speed of commutator 206 and of corresponding commutator 209 has been indicated as 2000 revolutions per second. At this speed, brush 207 of commutator 206 will rest upon each commutator segment once every 500 microseconds. Since talker identity generator 302 must advance one digit for each talker identity while brush 207 is advancing to the next commutator segment corresponding to that particular talker, oscillator 301 must have a frequency of 2000n, that is, n times the switching frequency of commutator 206. In the illustrative embodiment cited above where the TASI system employs 36 transmission channels to accommodate 120 talkers, the frequency of oscillator 301 is 240 kilocycles.

It should be noted that while identity generator 302 and memory unit 309 are not indicated as being in synchronism, they may, nevertheless, be driven from a common timing source. In this case, however, it is still unnecessary to maintain phase synchronism.

To make these nonsynchronous and nonintegrally related speeds of generator 302 and memory 309 possible, queue register 305 is provided. In effect, queue register 305 takes the talker identity codes as they are generated and stores them until a vacant time slot comes up in memory 309. Queue register 305 is therefore a "short memory" which takes up the "time slack" between talker identity generator 302 and circulating memory unit 309. In addition, queue register 305 has been given another useful function.

In a large TASI system such as a 36 channel-120 talker system, a relatively large number of talkers may become active at substantially the same time. Memory unit 309 is, however, unable to handle the required simultaneous assignments because of its sequential nature. A purely random order of assignment of talkers to channels in this situation makes possible an excessively long "freeze-out" of at least one talker merely by operation of the law of averages. A "freeze-out" in general, is a period in which a talker is engaged in making a spurt of speech and yet is denied service by the TASI system. To avoid any excessively long freeze-outs, it is desirable to handle the talkers in the order in which they become active. This will decrease the probability of such excessively long freeze-outs by taking talkers as soon as is possible with the particular load level of the system. Queue register 305, therefore, by having a plurality of stages, "queues up" these talkers in the order in which they become active and delivers their identity codes to memory unit 309 in that order.

Now that the essential function of active talker to idle channel assignment has been described, we will proceed to a description of the manner in which the TASI receiver is made aware of this assignment.

CONNECTION

Before the TASI transmitter can begin sending a particular speech spurt to the receiver, it must indicate to the receiver for which listener that particular speech spurt is intended. The manner in which this is accomplished will be described below.

Binary signal generator 321 continuously produces on its two output leads the binary number "01." As indicated above, this binary code indicates that a channel is being signaled over for connection. When memory entry switch 315 is enabled by a pulse on output line 311 of translator 310, it gates this "01" binary code into the channel status digit portion of memory unit 309. Furthermore, this "01" code is introduced into the same time slot in memory 309 that the identity code of a newly active talker is introduced from queue register 305. Thus, there is associated with the identity of this newly active talker and the transmission channel assigned to this particular time slot, the information that this particular channel is being used for connect signaling.

This conect signaling code, upon arriving at the bottom of circulating memory unit 309, is introduced into translator 310 and produces an output on output line 312. This output enables a switch 322 which gates that particular talker identity code to a connect signal source 323. Connect signal source 323 produces a multifrequency tone signal which is frequency coded to the same talker identity as is introduced at its input. Such a connect signal source is disclosed in the copending application of R. L. Carbrey, Serial No. 430,181, filed May 17, 1954, since matured into U.S. Patent 2,907,829, issued October 6, 1959. It comprises seven frequency sources separately gated by the digits of the talker identity code and fed into a summing amplifier. Any other frequency coding source would, of course, also be suitable.

Connect signal source 323 produces on connect signal bus 324 this frequency coded signal. Connect signal bus 324 is in turn connected to time separation multiplex bus 107 and is distributed by commutator 403 to the proper transmission channel. Thus, prior to the actual transmission of the speech spurt over a particular transmission channel, a frequency coded signal is transmitted over that same channel indicating to the receiver to which listener that channel is to be connected.

For the receiver to properly identify this connect signal, it has been found that the multifrequency tone must be sustained for a period of about 10 milliseconds. The means by which this is accomplished will now be described.

An .8 kilocycle oscillator 325 synchronized with memory unit 309 and commutator 403 is used to drive a three-digit binary counter 325. Binary counter 326 continuously produces on its three output leads the binary representations of the numbers one through eight, respectively, in succession. When memory entry switch 315 is operated by a signal on line 311, indicating that an idle channel is available, this three-digit binary code is gated into the connect signal timing portion of a memory unit 309 simultaneously with the talker identity code and the "01" channel status digits. Thus, there is associated with each talker as he is registered in the memory unit a unique three-digit binary code which indicates the instant at which that talker was registered.

In accordance with this aspect of the present invention, these same three timing digits are simultaneously introduced into an eight stage storage register 327. Storage register 327 is capable of simultaneously holding up to eight different three-digit timing codes. The timing codes in register 327 are advanced one stage for each cycle of oscillator 325 which has an .8 kilocycle output. It can thus be seen that each timing code is retained in storage register 327 for an interval of 10 milliseconds, corresponding to the proper signaling interval. Storage register 327 therefore acts as a 10 millisecond delay for these timing codes.

After leaving register 327, each of these timing codes is introduced into a comparative circuit 328. The corresponding connect signal timing digits in memory 309 are also introduced into comparator circuit 328 once each revolution of the memory unit. The function of comparator circuit 328 is to make a digit by digit comparison between the three-digit code introduced from register 327 and the three-digit code introduced from memory unit 309. This comparison may be accomplished by any one of the means well known in the art such as, for example, by the use of "coincidence" gates.

Since the information in memory 309 is circulating at an 8000 cycles per second rate, a coincidence of inputs to comparator 328 will not occur until a particular timing code group has circulated in the memory eighty times, the number of complete revolutions memory 309 will complete in 10 milliseconds. Each new code group delivered from storage register 327 will therefore be held at comparator 328 for ten complete revolutions of memory unit 309 and will be compared with the timing codes in all of the time slots in memory unit 309 ten times, thus insuring recognition.

Upon recognizing identical binary codes at its two inputs, comparator circuit 328 produces a pulse output on line 329. This pulse is used in a control circuit 330 to erase the "01" connect signal digits from the channel status portion of memory unit 309 and to write in in its place the digits "11." This indicates to the memory unit that the connect signaling interval is over and that it may now begin transmitting the actual spurt of speech. This function may be accomplished by momentarily opening up the memory loops for the channel status digits and then inserting the new code. The "11" digits in translator 310 cause switch 316 to be operated and, by way of translator 317, also cause the proper talker gate to be operated.

The connect signal timing portion of the memory unit 301 and the timing code have been provided to allow more than one talker to be signaled for connection at one time. This is necessary because in a large system many talkers could initiate speech spurts in the same 10 millisecond interval. If a single-acting timer were used, the last talker to become active would be required to wait until all previously active talkers had received connect signaling service. Thus, if seven other talkers became active immediately before him, he would be required to wait for a period of 70 milliseconds before connect signaling could even be begun for him. This unduly long wait would constitute an additional "freeze-out" and impair service accordingly.

In accordance with the illustrative embodiment of the present invention, binary counter 326 and multistage storage register 327 have been provided to enable up to eight talkers to be signaled for connection simultaneously. Of course, if it is desired that a larger or a smaller number of talkers receive service simultaneously, a storage register with the appropriate number of stages and advanced at the appropriate speed could be provided. The number eight has been provided in the illustrative embodiment because statistical studies have indicated that only a vanishing small percent of the time will eight or more talkers begin speech spurts in the same 10 millisecond interval on a 36 channel-120 talker TASI system.

Assuming for the time being, that the TASI receiver wil properly utilize the connect signal to connect the corresponding listener to the transmission channel assigned to an active talker, a detailed description of the means by which a previously assigned talker is disconnected from his assigned transmission channel to allow another talker to use this facility will now be given.

DISCONNECTION

As discussed above, the TASI system of the present invention is of the "seize and hold" type, that is, once a talker has been assigned to a transmission channel, he continues to be connected to that transmission channel even though his speech spurt has ceased. This arrangement simplifies the TASI system by decreasing the amount of supervisory information which must be recurrently transmitted to the receiver. This assignment of an active talker to a transmission channel is not terminated until a sufficient number of talkers have become active to make the use of this transmission channel necessary.

Thus, up to c talkers can be handled by the TASI system without any change in assignments being necessary. If the system is operating under such a comparatively small load, no information whatsoever need be transmitted to the receiver after the initial assignments inasmuch as the system operates without any reassignments of the individual transmission channels. If, however, more than c talkers are demanding service, means must be provided to disconnect the inactive ones of the assigned talkers and to assign newly active talkers to these now idle transmission channels. The means by which this is accomplished will now be described.

The output of switch control circuits, 210, 211 . . . 212, used to operate switches 213, 214 . . . 215, are also introduced into a counter circuit 216. Counter circuit 216 has n input leads corresponding to the n talker lines. The function of circuit 216 is to count the number of input lines upon which a signal appears. Since the outputs of switch control circuits 210, 211 and 212 indicate that their respective talkers have become active and, furthermore, have been assigned a transmission channel, counter circuit 216, in effect, counts the number of assigned channels. If this number is equal to or greater than c—1, that is, one less than the total number of transmission channels, counter circuit 216 produces an output which closes normally open switch 217. The left-hand side of switch 217 is connected to the "No" output leads of all the speech detectors 201, 202 . . . 203 through talker gating switches 104, 105 and 106, respectively. The right-hand side of switch 217 is connected by way of line 218 to "erase and write" circuit 330. Upon the closure of switch 217, a series of pulses appear on line 218 representing those talkers which have been given a channel assignment but are not at present actively engaged in a speech spurt. Circuit 330 erases the "11" code in the channel status digit portion of memory unit 309 and substitutes therefor the code "10" indicating that the channel is now being used for disconnect signaling. This reassignment of channel status codes is synchronized with the proper time slot in memory unit 309 by the operation of talker gating switches 104, 105 . . . 106 which allow this reassignment to take place only when the particular talker identity code comes to the bottom of memory unit 309, is sampled and is introduced into translator 317.

The channel status code "10" upon arriving at translator 310 produces an output on line 313. This output is used to produce a disconnect signal which is transmitted to the receiver and used to terminate this assignment at the receiver. The specific circuitry which accomplishes this function will now be described.

Figure 4:
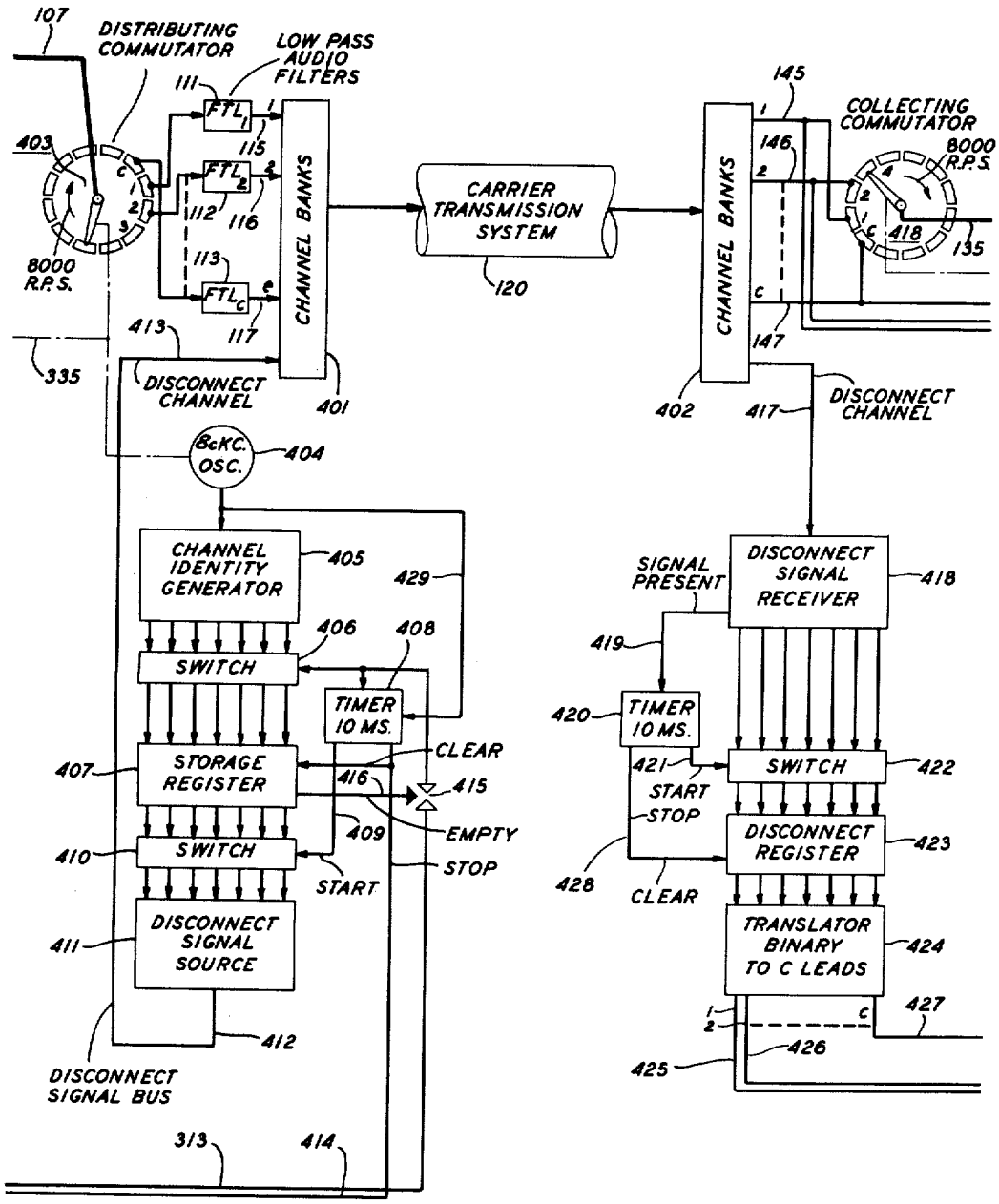
Figure 5:
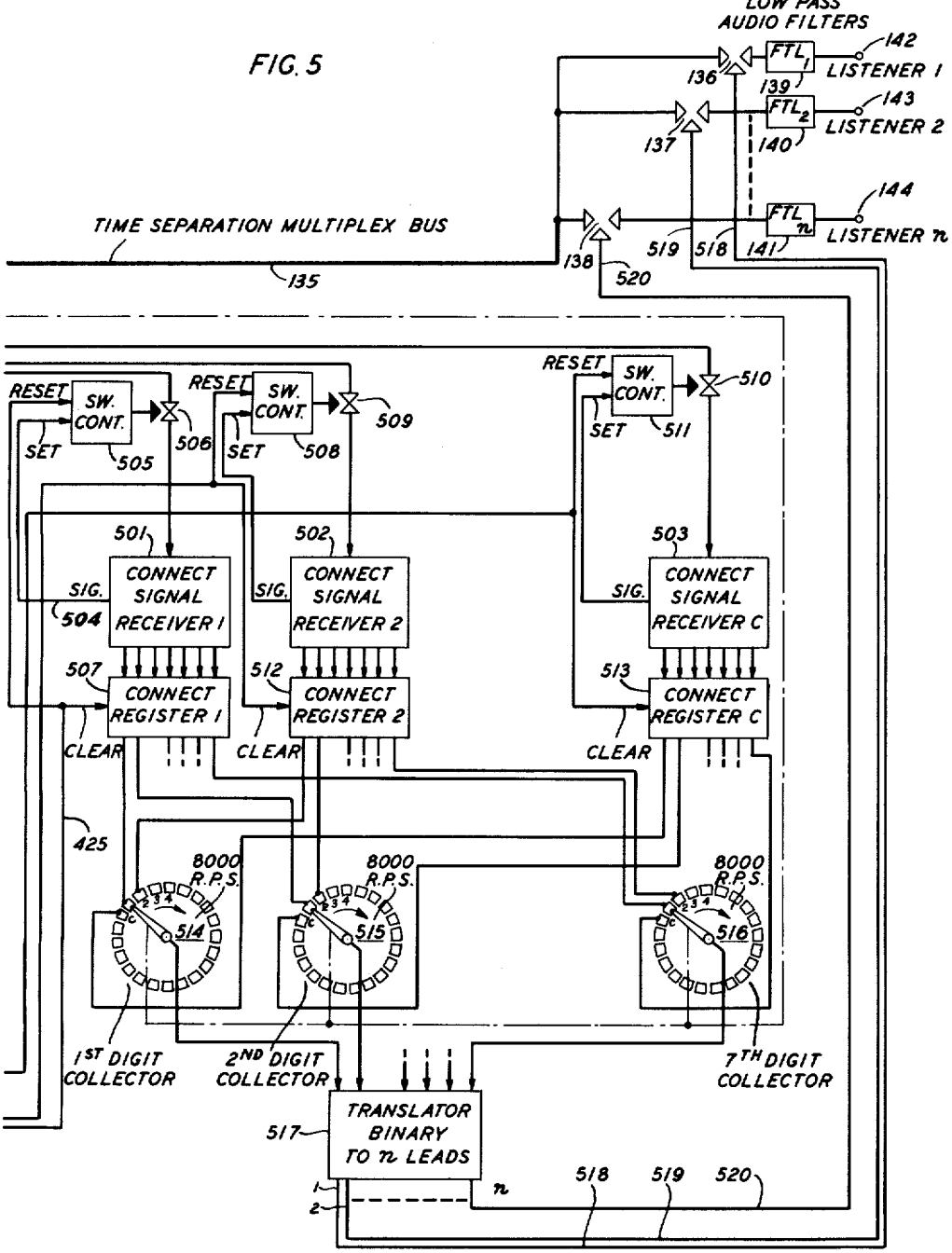

In the lower left-hand portion of FIG. 4 there is shown a disconnect signaling circuit comprising an oscillator 404 operated at a frequency of 8c kilocycles and which is synchronized with distributor commutator 403 and with memory unit 309. Oscillator 404 drives a channel identity generator 405. Generator 405 is a binary counter, similar to generator 302, which generates on seven output leads the binary numbers one through c in regular succession and continuously. Generator 405 is so timed that it generates a binary code corresponding to a particular transmission channel at the same instant that commutator 403 is connecting bus 107 to that particular channel.

A signal on output line 313 of translator 310 operates, by way of switch 415, a switch 406 which gates the channel identity code from generator 405 to a storage register 407. This same signal on line 313 also initiates a timing cycle in a timing circuit 408. Timing circuit 408 can be any one of the timing circuits well known in the art, for example, a binary counter which is started by a signal on line 313 and which counts the cycles of oscillator 404. In this case, such a counter would count eighty cycles of oscillator 404 to produce a ten millisecond timing interval. This ten millisecond interval, mentioned above in regards to connect signaling, is required for proper identification at the receiver of the multifrequency disconnect signal. In any event, timing circuit 408 produces two outputs, one on lead 409 and one on lead 414. The signal on lead 409 begins with the initiation of the timing cycle and is continuous for the ten millisecond duration. The other signal on lead 414 is of very short duration and appears precisely at the termination of the timing cycle.

A timing cycle is initiated by the application of a pulse to the timer input over lead 313. This initiation is exactly synchronized with the output of oscillator 404 by means of lead 429. At the beginning of its timing cycle, timer circuit 408 produces an output on line 409 which operates a scanning switch 410 for a ten millisecond interval. Switch 410 scans without destroying, the talker identity code which has been gated into storage register 407 and delivers this code to a disconnect signal source 411. Disconnect signal source 411 is similar to connect signal source 323. It produces on disconnect signal bus 412 a frequency coded signal identifying one out of c transmission channels. Disconnect signal bus 412 is connected to a disconnect signal channel 413 which is frequency multiplexed along with the speech transmission channels by channel banks 401.

Returning to timing circuit 408, at the termination of the timing interval the pulse on lead 409 ceases and timing circuit 408 produces an output on lead 414. This output clears storage register 407 and, furthermore, is returned to "erase and write" circuit 330 and "erase" circuit 331. All of the information in memory 309 corresponding to that channel is erased by means of "erase" circuit 331 while circuit 330 writes in a "00" code in the channel status portion of memory unit 309 indicating that this channel is now idle and ready for a new assignment. Synchronization is provided to timing circuit 408 from oscillator 404 in order that the correct channel information is erased by circuit 331. These erasing operations may be accomplished, for example, by opening the memory loops at the proper instant.

It will be noted that switch 406 will be operated by a signal on line 313 only when normally opened switch 415 is enabled. Switch 415 is enabled by a signal on line 416 from storage register 407 indicating that storage register 407 is empty, for example, by a simple AND gate. Thus, it is apparent that only one transmission channel can be signaled for a disconnect operation at one time.

It will be further noted that a completely separate and independent transmission channel has been provided for disconnect signaling rather than using a small portion of the bandwidth of the transmission channels being used for actual speech. This is done to prevent degradation of the speech signal by confining it to a narrower bandwidth. The disconnect signaling channel 413 may, however, occupy one edge of the frequency band of the transmission system 120 which is inadequate for transmission of speech signals but which is of sufficiently good quality to carry the multifrequency disconnect signals.

The means by which the TASI transmitter has made the assignment of active talkers to idle channels has been described. Similarly, a description of how the TASI transmitter gives an indication to the connected receiver of this assignment and when to terminate this assignment has also been given. The means by which these signals are utilized at the receiver to perform the necessary switching functions will now be described.

RECEPTION

The TASI receiver is a slave circuit of the transmitter, that is, it makes no independent determinations of its own. It merely utilizes supervisory signals received from the TASI transmitter to make the necessary connections.

As described with reference to FIG. 1, channel banks 402 separate and demodulate the frequency multiplex signals transmitted over carrier transmission system 120 and deliver the separate signals to c+1 output leads. Output leads 145, 146 . . . 147 correspond to the c transmission channels used for the transmission of speech signls. The other output line, 417, receives the disconnect signal introduced into the transmission system on line 413. The c transmission channels are connected to individual commutating segments of collecting commutator 418. Collecting commutator 418 is similar to distributing commutator 403, rotates at a speed of 8000 revolutions per second and connects the individual transmission channels in sequence to a time separation multiplex bus 135. Multiplex bus 135 is, in turn, connected to output terminals 142, 143 . . . 144 by way of listener gates 136, 137 . . . 138 and receiving filters 139, 140 . . . 141, respectively. These output terminals correspond to individual listeners, i.e., listener one through listener n. Listener one and talker one comprise one talker-listener pair as do listener two and talker two, listener n and talker n, and so forth.

It can be seen that if the proper listener gate is closed for the interval that the brush of commutator 418 rests upon the commutator segment corresponding to the transmission channel to which the paired talker has been connected, a complete speech connection from the talker to the listener is made. The means by which these listener gates are controlled will be described below.

It should be further noted that the collecting commutator 418 does not have to be operated in synchronism with distributing commutator 403. This is possible because low-pass filters 111 through 113 reconstruct the original speech signal from the pulse samples delivered by commutator 403. Since the TASI receiver does not have to be operated in synchronism with the TASI transmitter, no synchronizing information need be transmitted.

Returning to the control circuit of the TASI receiver, transmission channels 145, 146 . . . 147, in addition to being connected to segments of collector commutator 418, are also connected to individual connect signal receivers 501, 502 and 503, respectively. Connect signal receivers 501 through 503 receive and demodulate connect signals generated in connect signal source 323 by means of frequency separating filters and individual detectors connected to the filter output or by any other manner well known in the art. When a signal has been received by one of these connect signal receivers, it produces an output to a switch control circuit which disables that particular connect signal receiver from receiving any further signals. Thus, when connect signal receiver 501 receives a signal, an output is produced on line 504 which sets a switch control circuit 505, for example, a bistable multivibrator "flip-flop" circuit. Switch control circuit 505, in turn, opens normally closed switch 506, thus disconnecting connect signal receiver 501 from transmission channel one.

Connect signal receiver 501 produces, on seven parallel output leads, a binary representation of the talker identity code indicated by the connect signal received. This talker identity code is stored in a connect register 507 which continuously produces on its seven output leads this same talker identity code. Similarly, connect signal receiver 502, when it receives a connect signal, disables switch 509 by means of switch control circuit 508 and connect signal receiver 503 disables switch 510 through switch control circuit 511. In addition, connect signal receiver 502 produces a seven digit talker identity code which is stored in connect register 512, and connect signal receiver 503 produces a talker identity code which is stored in connect register 513.

Seven digit-collecting commutators 514, 515 . . . 516 are provided to sample each of these talker identity codes stored in registers 507, 512 and 513 8000 times each second. Thus, each collecting commutator is provided with c commutator segments and has a brush rotating at a speed of 8000 revolutions per second. Digit collecting commutator 514 collects the first binary digit from all of the connect registers in regular succession. Similarly, collecting commutator 515 collects the second digit from all of the connect registers and commutator 516 collects the seventh digit, all of these commutators acting in synchronism. It can be seen, therefore, that the talker identity codes stored in the connect registers appear in parallel on the commutating brushes of the digit-collecting commutators in regular succession at an eight kilocycle rate.

These parallel code digits are introduced into a translator 517 which is similar to translator 317 in the TASI transmitter. That is, translator 517 takes a seven-digit binary code on seven parallel input leads and produces a pulse on one out of n output leads. For example, a binary number "one" (0000001) produces an output on line 518, a binary number "two" (0000010) produces an output on line 519 and a binary n produces an output on line 520. A pulse on line 518 enables normally open listener gate 136, thus completing the connection between the assigned listener and the transmission channel. Similarly, a pulse on line 518 enables normally open listener gate 137 and a pulse on line 520 enables normally open listener gate 138.

It will be noted that since digit collecting commutators 514, 515 . . . 516 are operated in synchronism with collecting commutator 418, the listener gates will be closed at the same time as, and for the same interval, that the brush of commutator 418 rests upon the commutator segment corresponding to the assigned channel. The TASI receiver therefore utilizes the connect signals transmitted from the TASI receiver to reproduce the talker-to-channel assignment made in the transmitter. This assignment is retained in the receiver in connect registers 507, 512 and 513 even after the actual speech spurt has terminated. Thus, together these connect registers comprise a memory unit which retains the same information contained in circulating memory unit 309 in the TASI transmitter.

Static rather than dynamic memory is utilized at the receiver to simplify assignment checking and correction. Circuitry for providing such checking and correction are not shown inasmuch as it comprises no part of the present invention. It may, however, be the "two-out-of-three" type of error checking disclosed in the copending application of R. L. Carbrey, Serial No. 430,181, filed May 17, 1954, since matured into U.S. Patent 2,907,829, issued Oct. 6, 1959.

As is stated above, the connect registers 507, 512 and 513 retain their respective talker identity codes until specifically instructed to do otherwise. The means by which this is accomplished, that is, disconnection, will now be described.

Multifrequency coded disconnect signals received on disconnect channel 417 are delivered to a disconnect signal receiver 418. Disconnect signal receiver 418 is similar to connect signal receivers 501 through 503. It receives the frequency coded signal from channel 417 and generates on its seven output leads the parallel binary code corresponding to this multifrequency code. When a signal has been received by disconnect signal receiver 418, a pulse is produced on line 419 which initiates a timing cycle in timing circuit 420. Timing circuit 420 may be, for example, a simple monostable multivibrator. In any event, at the initiation of the timing cycle, timing circuit 420 produces a pulse on line 421 which operates a switch 422, gating the received channel identity code from disconnect signal receiver 418 to a disconnect register 423. Disconnect register 423 stores this binary code in much the same manner that connect registers 507, 512 and 513 store the identity codes of assigned talkers. A translating circuit 424 converts this seven-digit binary code to an output pulse on one out of c output leads. Thus, a binary number "one" (0000001) produces an output pulse on line 425, a binary "two" (0000010) produces an output pulse on line 425 and a binary c produces an output pulse on line 427. Line 425 is connected to switch control circuit 505 and to connect register 507. A pulse on line 425 therefore simultaneously resets control circuit 505 to re-enable switch 506 and clears connect register 507.

Thus, the disconnect binary code appearing in channel 417 clears the talker identity code stored in the connect register corresponding to the channel identity code and also reconnects the connect signal receiver corresponding to that channel enabling it to receive a new talker identity code.

Returning to timing circuit 420, at the termination of a 10 millisecond timing interval, a signal appears on line 428 which clears disconnect register 423 of the channel identity code stored there and prepares it for the reception of a new channel identity code.

It can be seen that the receiver portion of the disconnect signal system utilizes the coded identity of a particular channel to terminate the assignment of that channel at the TASI receiver. It can make one such termination during each 10 millisecond interval. This rate of disconnection is considered sufficiently fast to accommodate a 36 channel-120 talker TASI system because, unlike the connect signal operation, no portion of a previously assigned talker's speech spurt is lost by a slight delay in the disconnect operation.

A time assignment speech interpolation system has been described which is suitable for accommodating any number of transmission channels (c) and any number of talkers (n). As discussed in the introduction, however, the greatest economies are to be obtained in relatively large TASI systems such as, for example, a 36 channel system serving up to 120 talkers. Such large TASI systems would secure larger economies due to the more complete utilization of the capacity of the TASI terminal facilities.

It is to be understood that the above-described arrangements are only illustrative of the numerous and varied other arrangements which could represent applications of the principles of the invention. Such other arrangements may readily be devised by those skilled in the art without departing from either the spirit or the scope of the invention.

What is claimed is:

1. In a signal transmission system, a plurality of signal sources each of which may be either active or idle, means providing a lesser plurality of transmission channels, means for enabling said transmission channels in regular succession, means for generating binary coded identifications of said signal sources as they become active, a register, means for reading said identifications into said register in the order of their generation, a memory, means for asynchronously transferring the longest-registered identification into said memory, and means, synchronized with said enabling means and controlled by said memory, for gating said sources into said channels.

2. A time assignment signal interpolation transmitter comprising a plurality of signal sources, a lesser plurality of transmission channels, a time separation multiplex bus interposed between said signal sources and said transmission channels, means for gating said multiplex bus into said transmission channels in regular succession, reentrant memory means synchronized with said gating means, means for generating the identification of active ones of said signal sources, multistage storage register means for queuing said identifications in the order of their generation, means for asynchronously transferring the contents of said register means into said memory means in time slots corresponding to idle ones of said transmission channels, and means, synchronized with said gating means and controlled by said transferred identifications, for successively gating said signal sources onto said multiplex bus.

3. A time assignment signal interpolation transmitter according to claim 2 further comprising means for transmitting said registered identifications for a predetermined interval, said transmitting means including further multistage storage register means for timing said predetermined interval.

4. In a time assignment signal interpolation system, a plurality of signal sources, a lesser plurality of transmission channels, a time division multiplex transmission facility interposed between said signal sources and said transmission channels, means for connecting said multiplex facility to said transmission channels in regular succession, circulating memory means synchronized with said connecting means, scanning means for determining the activity of said signal sources and for generating the identifications of active ones of said signal sources, multistage storage register means for storing said identifications, means for asynchronously gating said identifications from said register means to said memory means, and means, synchronized with said memory means and controlled by said identifications, for connecting each of said signal sources to said multiplex facility, and means for maintaining said connections after said signal sources have become inactive.

5. The combination according to claim 4 further including means for transmitting said identifications, said transmitting means comprising a timing code generator, means for associating said timing code with said identifications, means for delaying said timing code for a predetermined interval, means, controlled by said identifications, for generating an identity code, means for gating said identifications to said identity code generating means, means, controlled by said associating means, for enabling said gating means, and means, controlled by the output of said delay means, for disabling said gating means.

6. The combination according to claim 5 wherein said delay means comprises shift register means.

7. The combination according to claim 4 further including means for removing said identifications from said memory means and means for removing one of said identifications when said count exceeds a predetermined number.

8. The combination according to claim 7 wherein said removing means includes means for transmitting a disconnect signal over a separate disconnect transmission channel.

9. The combination according to claim 4 further including means for disabling said identification generating means for those signal sources having identifications stored in said register means.

10. In a signal interpolation system, a plurality of signal sources and corresponding utilization circuits, a lesser plurality of transmission channels, means, including a circulating memory unit, for assigning active ones of said signal sources to idle ones of said transmission channels, and means for transmitting a signal representing each said assignment to said utilization circuits for a predetermined interval, said signal transmitting means comprising a cyclic code generator, means for registering a code in said memory unit for each of said assignments to initiate one of said signals, multistage storage register means, means for registering each of said codes in said storage register means, means for advancing registered codes between successive stages of said register means, means for comparing the output of the last stage of said storage register means and the contents of said memory unit, and means for terminating one of said signals each time said comparing means indicates an identity.

11. In a time assignment signal interpolation system, means for timing the duration of connect signaling comprising means for generating a plurality of regularly spaced dissimilar code groups, means for associating unique ones of said code groups with newly active speech sources in said system, means for delaying said code groups for a predetermined duration, means for deriving control signals when the outputs of said delay means are identical with particular ones of said associated code groups, and means for signaling a plurality of connections until said control signals are derived.

12. A timing circuit for simultaneously timing a plurality of intervals comprising means for successively generating a sequence of binary numbers, means for storing that number of said sequence which is instantaneously generated at the beginning of each of the timed intervals, multistage storage register means, means for registering said number in said storage register means, means for regularly advancing the numbers registered in said storage register means, means for comparing the output of said storage register means and the contents of said storing means, and means for terminating each of said intervals in response to an identity between said output and said stored code.

13. Means for accurately timing a predetermined interval between two successive operations comprising means for generating a plurality of binary code groups in regular succession, means for storing one of said code groups in response to a first one of said operations, means responsive to said code groups for producing an output comprising said one code group said predetermined interval after said first operation, means for generating a signal when the output of said last-named means and the contents of said storing means are identical, and means for initiating a second one of said operations in response to said signal.

14. In an interpolated multiplex transmission system, a plurality of signal sources, a lesser plurality of utilization means, means for scanning said sources in rotation to determine source activity, means for generating a binary code identification of each source thus determined to be active, means for storing said binary codes in the order of their generation, means for asynchronously scanning said utilization means to determine availability, and means for assigning the longest-identified source to the next available utilization means.

15. The combination according to claim 14 in which said storing means comprises a multistage storage mechanism wherein said coded identities are regularly advanced between successive stages.

16. In a time assignment speech interpolation system, a plurality of signal sources, a lesser plurality of transmission channels, means for cyclically scanning said sources for activity, means responsive to said scanning means for generating a binary code identifying each source thus determined to be active, buffer storage means for storing a plurality of said binary codes, means for asynchronously assigning said binary codes to said channels, and means responsive to said assigning means for connecting each identified source to its assigned channel.

17. The combination according to claim 16 in which said buffer storage means includes means for queuing said binary codes in the order in which said sources become active.

18. In a time assignment speech interpolation system for interpolating signals from a plurality of sources on a lesser plurality of transmission paths, means for scanning said sources in rotation to determine signal activity, means for generating an identification code for each signal source thus found to be active, means for enabling said transmission paths in rotation, information storage means having a unique storage position corresponding to each of said transmission paths, means for asynchronously writing each of said codes into one of said storage positions to provide assignments of active ones of said sources to unique ones of said transmission paths, means for reading said identifications from said storage means in synchronism with said enabling means, and means responsive to said reading means for connecting each of said sources to the assigned one of said paths.

19. The combination according to claim 18 in which said asynchronous writing means includes buffer storage means for storing said identification codes until so written.

20. In a time assignment speech interpolation system, a plurality of signal sources, a lesser plurality of transmission channels, means for determining the activity of each of said signal sources, means for generating an identification of each of said sources as it becomes active, buffer register means, means for writing said identifications in said buffer register means, information storage means corresponding to each of said channels, means for cyclically generating binary timing codes, means for determining the availability of each of said channels, means for simultaneously transferring the longest-registered identification in said buffer register means and writing one of said timing codes into a unique one of said information storage means corresponding to an available channel, means for transmitting each identification so transferred over the corresponding channel, delay means, means for applying said timing codes to said delay means, means for comparing the output of said delay means to each stored timing code to recognize coincidences, means for disabling said identification transmitting means for each storage means when said coincidence occurs, and means for connecting each identified source to the corresponding channel after the disablement of said identification transmitting means.

21. The combination according to claim 20 in which said buffer register means comprises a plurality of stages of storage connected in tandem to simultaneously store a plurality of said identifications in the order of their registration.

22. The combination according to claim 20 in which said delay means comprises a plurality of stages of storage connected in tandem, and means for regularly advancing said timing codes between successive stages.

*23. In a time division multiplex switching system, a plurality of communication paths, a time division multiplex link, gating means for connecting each of said communication paths to said multiplex link, circulating memory operating in repetitive cycles of successive time slots, means for storing in selected time slots of said memory means a coded identification of each connection to be completed between said communication paths, separate means for storing in selected time slots of said memory means a coded identification of the sequence state of each said connection to be completed, and means responsive to said connection identifications, and controlled by said sequence state identifications for recurrently operating selected ones of said gating means to complete the identified connections between the communication paths connected to said gating means.*

*24. Apparatus for controlling the connections in a switching system comprising means for assigning to each said connection a time slot in a recurring cycle of time solts, circulating memory means the operation of which is likewise divided into recurring cycles of time slots, means for storing in said memory means a coded identification of each said connection in the time slot assigned to that connection, separate means for storing in said memory means a coded representation of the status of each said connection in a time slot also assigned to that connection, and means responsive to said coded identifications, and controlled by said coded representations for establishing, maintaining and terminating each of said connections.*

References Cited in the file of this patent or the original patent

UNITED STATES PATENTS

| | | |
|---|---|---|
| 2,541,932 | Melhose | Feb. 13, 1951 |
| 2,773,934 | Trousdale et al. | Dec. 11, 1956 |
| 2,917,583 | Burton et al. | Dec. 15, 1959 |
| 2,984,705 | Harris | May 16, 1961 |